(12) United States Patent
Blood

(10) Patent No.: US 6,537,175 B1
(45) Date of Patent: Mar. 25, 2003

(54) POWER SYSTEM

(76) Inventor: Michael W. Blood, 1816 SW. Third St., Lee's Summit, MO (US) 64081

( * ) Notice: Subject to any disclaimer, the term of this patent is extended or adjusted under 35 U.S.C. 154(b) by 32 days.

(21) Appl. No.: 09/684,829

(22) Filed: Oct. 10, 2000

(51) Int. Cl.$^7$ .......................... B60K 41/12; B60K 41/02
(52) U.S. Cl. .............................. 477/44; 477/41; 475/210
(58) Field of Search ............................... 477/41, 44, 97, 477/107; 475/210

(56) References Cited

U.S. PATENT DOCUMENTS

| | | | | |
|---|---|---|---|---|
| 2,158,047 A | * | 5/1939 | Weston | 74/230.17 |
| 2,221,166 A | * | 11/1940 | Heinrich et al. | 74/230.17 |
| 2,623,410 A | * | 12/1952 | Billey | 74/689 |
| 2,803,151 A | | 8/1957 | Clerk | |
| 2,935,899 A | | 5/1960 | Nalliqner | |
| 2,927,470 A | * | 11/1960 | Heyer | 74/230.17 |
| 3,128,636 A | * | 4/1964 | Graybill | 74/472 |
| 3,665,788 A | | 5/1972 | Nyman | |
| 3,771,311 A | | 11/1973 | Herbst | |
| 4,056,987 A | * | 11/1977 | Hoffmann | 474/23 |
| 4,282,947 A | | 8/1981 | Kemper | |
| 4,282,948 A | | 8/1981 | Jerome | |
| 4,458,318 A | * | 7/1984 | Smit et al. | 364/424.1 |
| 4,864,894 A | | 9/1989 | Falzoni | |
| 4,875,893 A | * | 10/1989 | Giacosa | 474/28 |
| 5,244,054 A | | 9/1993 | Parry | |
| 5,851,164 A | * | 12/1998 | Habuchi et al. | 477/127 |
| 6,020,697 A | * | 2/2000 | Shimasaki et al. | 318/140 |
| 6,398,679 B1 | * | 6/2002 | Brown | 474/14 |

OTHER PUBLICATIONS

The Illustrated Science and Invention Encyclopedia, vol. 2, 1977 published by H.S. Stuttman Co., Inc., pp. 201–203.
Standard Handbook of Machine Design, Joseph E. Shigley and Charles R. Mischke, pp. 31.32–31.40, published by McGraw–Hill Book Company.
Introduction to Kinematics, Thomas B. Hardison, pp. 256–260, published by Reston Publishing Company.

* cited by examiner

Primary Examiner—Rodney H. Bonck
Assistant Examiner—Eric M Williams
(74) Attorney, Agent, or Firm—Chase Law Firm, L.C.

(57) ABSTRACT

A power system for a vehicle includes a motor, a flywheel and a transmission. Intermediate the motor and flywheel and coupled thereto is a first expansion pulley system with a second expansion pulley system intermediate the flywheel and transmission and coupled thereto. A programmable computer receives information concerning a desired vehicle speed and road level and processes the information so as to vary the motor r.p.m.s in order to reach a desired vehicle speed. The pulley systems effectively transmit the power from the motor through the flywheel and to the transmission at preselected ratios so as to provide for an efficient power delivery and vehicle acceleration. An additional expansion pulley system drives accessories at a constant preselected r.p.m. to preclude the transfer of needless power from the motor to the accessories.

18 Claims, 1 Drawing Sheet

POWER SYSTEM

BACKGROUND OF THE INVENTION

This invention relates to a power system and, more particularly, to a power system which achieves a maximum operating efficiency by independent manipulation of the power plant r.p.m. and flywheel input and output r.p.m. all in recognition of predetermined power requirements.

Various power systems have been proposed in an attempt to efficiently move vehicles with an accompanying reduction of fuel consumption and/or pollutant emission. One system known as a variomatic transmission utilized expanding pulleys directly geared to the rear wheels. However, such a system was admittedly inefficient in supplying suitable torque to drive large vehicles. Moreover, past power systems utilizing manual or automatic transmissions are inefficient. In conventional systems, much of the horsepower supplied by the engine is lost during its delivery from the engine to the drive wheels. The resistance of the drive wheels, as transferred to the power train, presents various junctions of mechanical disadvantage which are overcome by increasing the horsepower of the power plant.

Also, the power plant in a manual transmission equipped vehicle is not under a flywheel load when the clutch disc is disengaged from the flywheel. When first gear is selected the power plant is brought up to a sufficient r.p.m. to engage the clutch disc with the flywheel at a sufficient torque to put the vehicle in motion. Thus, the acceleration begins. The power plant must increase its r.p.m. to increase the vehicle speed. The point at which the engine operates most efficiently is reached when the engine r.p.m. and torque peak curves coincide. Ideally at this point the shift to the next higher gear is made.

As the clutch disc is disengaged from the flywheel to shift to second gear engine r.p.m. drops. At this point inefficiency occurs as the power plant r.p.m. drops during the gear change. Thus, the flywheels kinetic energy, inducing the vehicle's forward inertia, is lost. Thus, the conventional flywheel becomes a disadvantageous and unnecessary load on the power plant. Once the higher gear is engaged and the clutch disc re-engages the flywheel, the power plant must again produce the power necessary to propel both the flywheel and vehicle simultaneously, relying on the force produced by the combustion of the fuel/air mixture in the engine cylinders. Thus, piston/cylinder size is of importance.

This sequence of events is repeated with each gear change, road inclination (grade) change and vehicle acceleration.

Vehicles equipped with automatic transmissions never gain the advantage of increasing kinetic energy because of principles in hydraulics as applied to modern passenger vehicles. Although the constant drag on the power plant under idle conditions can be alleviated, the torque converter is a constant load on the power plant under all vehicle operating conditions. By the very nature of the automatic transmission equipped vehicle, the power plant and torque converter r.p.m. are always the same and the acceleration process begins at the low r.p.m. range of the power plant. No kinetic energy/inertia advantage is ever enjoyed. Thus, no advantage as to kinetic energy is ever ideally achieved in past vehicle power systems.

In response thereto I have invented a vehicle power system which utilizes an efficient power source preselected to move a vehicle at a range of preselected vehicle speeds with appropriate acceleration. The engine power is delivered to an input side of a flywheel at a precise r.p.m. by means of an intermediate, variable speed expansion pulley system as controlled by computer generated signals responsive to throttle depression and road grade. A second computer-controlled expansion pulley system is positioned intermediate the output side of the flywheel and transmission to deliver power to the downstream transmission. The control unit signals change the pitch of the expansion pulleys so as to efficiently and continuously transfer the power from the power source to the transmission without disengagement of the flywheel. In turn, the above problems are avoided as a plurality of ratios between the power plant and drive wheels are presented. Thus, small, high r.p.m. power plants can be utilized. The transmission is fluid controlled in coordination with selected vehicle speed ranges so that it will shift through efficient gears. Control of the input and output r.p.m.s, relative to the flywheel, enable one to pre-design an efficient power drive system. Also the accessories associated with the power system are driven at a constant functional r.p.m. Thus, no additional, unnecessary power need be delivered to power such accessories.

It is therefore a general object of this invention to provide a power system for a motor vehicle or the like.

Another object of this invention is to provide an efficient power plant which efficiently translates the energy of a power plant to the driven vehicle wheels.

A further object of this invention is to provide a system, as aforesaid, which provides a maximum safe power output for driving a selected vehicle load at preselected speeds.

A further object of this invention is to provide a system, as aforesaid, having an acceleration controlled by manipulation of the power plant r.p.m., flywheel r.p.m. and transmission so as to provide precise rates of acceleration and maximum top end speed.

Another object of this invention is to provide a system, as aforesaid, which provides an efficient rate of acceleration to the vehicle without the need to intermittently disengage the flywheel from the system.

Still a further object of the invention is to provide a system, as aforesaid, which allows for the preselection of an efficient power source so as to reduce the undesirable emissions emanating therefrom.

Another particular object of this invention is to provide a system, as aforesaid, which enables a preselection of efficient operating characteristics for a selected vehicle load.

A further particular object of this invention is to provide a system, as aforesaid, which provides for an efficient delivery of power for operating accessories associated with the system.

Other objects and advantages of this invention will become apparent from the following description taken in connection with the accompanying drawings, wherein is set forth by way of illustration and example, a now preferred embodiment of this invention.

DESCRIPTION OF THE PREFERRED EMBODIMENT

Figure 1:
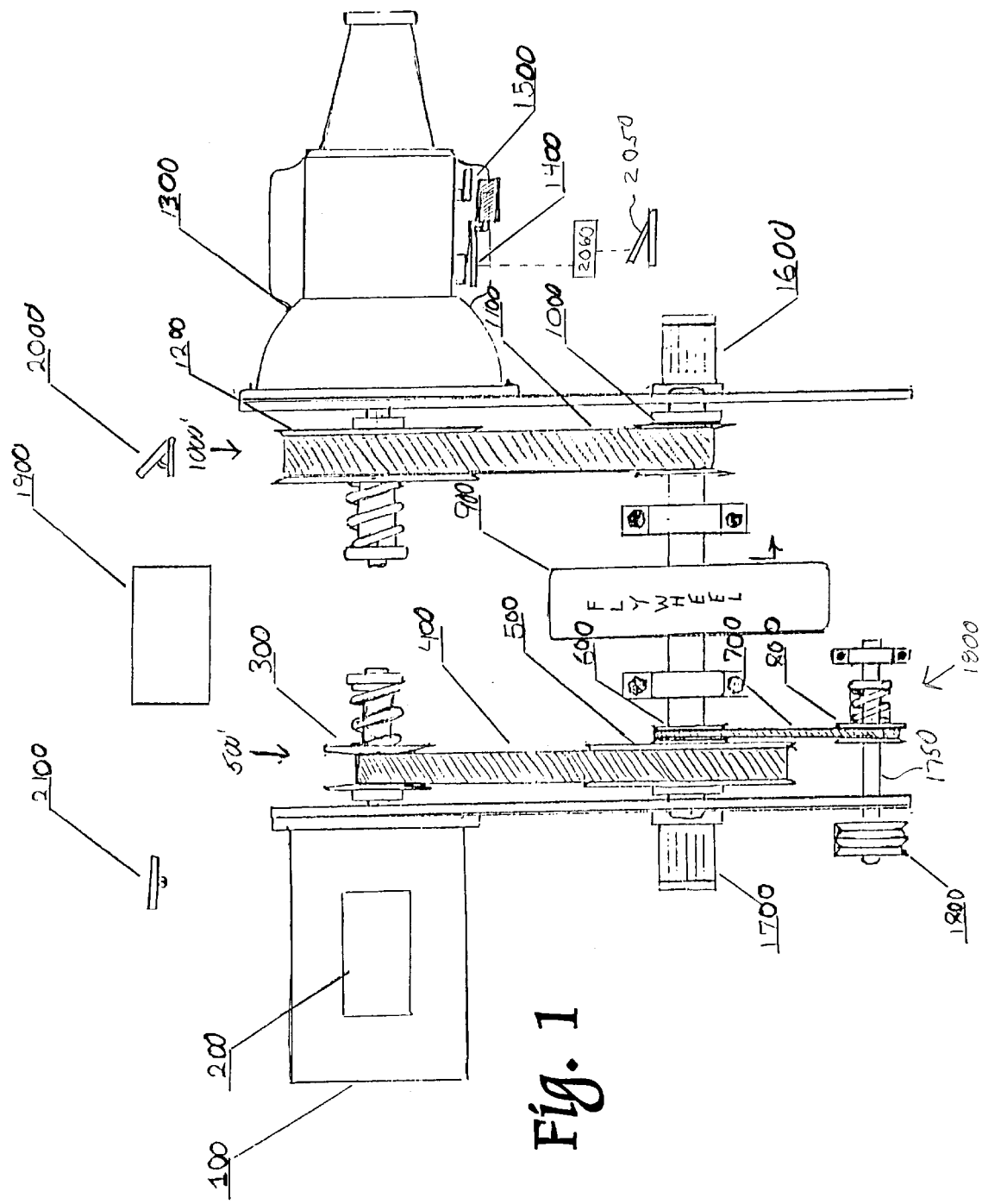
FIG. 1 is a diagrammatic view showing the component parts of the power system.

Turning more particularly to the drawings, FIG. 1 shows the components of the power system in a diagrammatic form. Power plant 100, whether in the form of a gas or electric motor, is chosen to have a maximum r.p.m. for driving a selected vehicle load at a selected top speed.

Although various power plants may be selected, a rotary gas engine is a desirable power source as it has high r.p.m. and horsepower output, small size, light weight and fewer moving parts resulting in a greater reliability. Also, such engines, being adaptable to fit various horsepower needs, operate more efficiently at a higher r.p.m. than a reciprocating piston engine.

As part of development of my system a top desired speed is selected. As most vehicles need not exceed 75 m.p.h. in most driving conditions a motor 100 having a maximum output r.p.m. to efficiently achieve such a selected maximum speed is chosen. Thus, additional motor r.p.m.s to achieve a speed beyond this maximum speed need not be utilized provided that the acceleration of the vehicle efficiently achieves such maximum speed. The ability to provide such a maximum top vehicle speed without a significant loss in effective acceleration is a prime advantage of my system.

In connection with such speed the force necessary to put a vehicle of a selected weight in motion and maintain the vehicle at a top speed can also be determined. Thus, a chosen power plant 100 is desirable which will spin a conventional flywheel 900 at a maximum r.p.m. so as to supply the torque to transmission 1300 which is necessary for effective acceleration of the vehicle to such top speed. To spin the flywheel at greater r.p.m.s is a waste of energy. Also, to further achieve optimum efficiency the system flywheel should not be disengaged from the system during operation. As such the maximum flywheel weight, diameter and r.p.m. can be preselected and coordinated with the chosen power plant.

Transmission 1300 applies power to the drive wheels. The torque converter is eliminated with the transmission being controlled by means of an on/off fluid control valve 1400 which opens upon sensing 2060 a depression of a brake pedal 2050 and closes upon sensing 2060 a let off of a brake pedal 2050 and at preselected r.p.m. levels so as to shift the transmission 1300 into different gears at different preselected speeds, such as 25 m.p.h. and 50 m.p.h. This ratio presents three speed ranges which encompass the driving speeds for most vehicles.

The use of a power plant, flywheel and transmission is known. However, my novel delivery of power from the power plant 100 to the transmission via upstream and downstream expansion pulley systems 500, 1000, relative to the flywheel 900, presents the ability to continuously adjust the r.p.m. ratio therebetween. This continuous flexibility allows for an efficient power plant to be selected which will efficiently accelerate the vehicle throughout the desired operating range of the vehicle.

As such I provide first 500 and second 1000 expansive pulley systems on the input and output sides of the flywheel 900. A first expansion pulley system 500 controls the delivery of r.p.m.s to the input side of the flywheel 900. This system 500 is positioned intermediate the power plant and input side of the flywheel 900. The second pulley system 1000 ultimately controls the torque delivered to the input of transmission 1300. These pulley systems are controlled by a computer unit 1900 so as to continuously change the mechanical advantages relative to the flywheel 900. The two coordinated pulley systems 500, 1000 ultimately provide the desired torque to the transmission 1300 so as to drive the wheels at a desired speed with a minimum of energy loss from the motor 100. Thus, a small power plant 100 acting at a high r.p.m. can apply torque similar to a large power plant acting at a lower r.p.m.

As above, the chosen top vehicle speed is coordinated with the maximum r.p.m. of the chosen power source to drive a selected vehicle load. This maximum r.p.m. also is selected so as to also operate vehicle accessories connected to a pulley 1800. The top end speed is thus controlled by limiting the maximum r.p.m. of the power source 100 and by the selection of the minimum/maximum gear ratios as supplied by the pulley systems 500, 1000. The vehicle acceleration rates to the top speed are controlled by the horsepower delivered from the power source at selected r.p.m.s and manipulation of these expansion pulley systems.

The accessories pulley system 1800 includes expansion pulley 600 which has a left movable plate attached to the movable right plate of the expansion pulley 500. Belt 700 is attached to spring tensioned pulley 800 which in turn drives shaft 1750 connected to accessory pulley 1800 for a belt driven power of the system accessories. As such once the minimum r.p.m. is determined to insure the proper operation of accessory devices, e.g., water pump, alternator, power steering, etc., the proper r.p.m.s can be maintained at this level as movement of plate of pulley 500 will also move the plate of pulley 600. Thus, the pitch of pulley 600 is adjustable so that no additional, unnecessary power need be delivered to pulley 800 by belt 700 as is in conventional systems as the accessories pulley is being driven at the engine r.p.m.s.

The system includes a computer control unit 1900 which receives information from signals corresponding to the degree of depression of the acceleration pedal 2000 as well as a grade level sensor 2100. The control unit is preprogrammed with desired operating characteristics curves throughout the desired range of vehicle speeds and at the various possible road levels which support the vehicle. Thus, conventional programming techniques can be utilized to determine the desired operating characteristics and the fuel that needs to be delivered to the motor 100 by the fuel injection system 200 so as to achieve such characteristic, i.e., to power the vehicle at a selected speed on a selected grade. Such operating characteristic curves will include the desired ratios of the pulley systems needed to achieve this particular operating characteristic. Thus, the control unit 900 will generate output signals not only to control fuel delivery but also the servo motors 1600, 1700 associated with the expansion pulleys 500, 1200. These motors will appropriately increase or decrease the effective radius of the same to achieve the desire ratios among the pulley systems.

To begin acceleration the power plant 100 is set at a preselected idle r.p.m. with the fluid control valve 1400 on the transmission 1300 being in the open position. Level sensor 2100 feeds grade information into the computer 1900. Upon depression of throttle pedal 2000 the degree of depression is sent to the computer 1900 for translation into a signal corresponding to a desired vehicle speed. The computer 1900 utilizing the desired, preprogrammed operating characteristics then delivers signal information to the fuel injection system 200 to bring the output shaft of the power plant 100 to a desired r.p.m. to achieve such speed on the road level as sensed by sensor 2100. At this time the computer sends signals to the servos 1700 which adjust the first expansion pulley 500 so as to transfer the desired r.p.m.s from motor 100 shaft to the flywheel 900 shaft at an optimum rate. The size of pulley 500 adjacent the input side of flywheel 900 approximates the size of the flywheel 900. Thus a bigger gear ratio on the drive side of the flywheel 900 is presented. (It is understood that pulley 300 is a spring tensioned pulley on motor shaft.) Concurrently, the second expansion pulley 1000 is adjusted by servo 1600 so as to provide the proper torque on shaft which drives the transmission 1300. (Pulley 1200 is a spring tension pulley of the system having a size approximating pulley 500. Thus, a bigger gear ratio on the drive side of the transmission is presented)

Concurrently, the transmission 1300, as fluid controlled by computer-controlled valve opening and closure, will shaft gears according to the range in which the desired vehicle speed is located. The desired vehicle speed is thus efficiently provided by a preselected power plant r.p.m., preselected expansion pulley ratios and transmission gear. As these factors can now all be preselected, predetermined operating characteristic curves can be stored in the computer which will vary according to power plant, vehicle weight, desired vehicle speeds, road levels and other desired parameters. My system enables the characteristics of such preselected optimal curves to be preselected, stored and thus achieved. Once the desired vehicle speed is achieved, the level sensor 2100 information to the computer can further adjust the power plant 100 r.p.m. and expansion pulleys 500, 1000. If vehicle speeds are needed outside a present gear range the computer will generate signals to accordingly open or close the fluid valve 1400 to allow the transmission to move to the gear enveloping the speed.

Accordingly, it can be seen that a continuous adjustment of the engine r.p.m.s, expansion pulleys and transmission corresponding to a desired vehicle speed is being achieved. As such adjustment is continuous there are no points of mechanical disadvantage in the system, as in past systems, which must be overcome by increasing engine horsepower. Thus, there is no waste in power delivery to the transmission and/or power system accessories, which contributes to an overall, effective power system.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A power system for a vehicle comprising:
   an engine including an output drive shaft;
   a first expansion pulley system comprising:
      a first spring tensioned pulley attached to said output drive shaft of said engine;
      a first expansion pulley having an adjustable radius attached to a first end of a downstream flywheel shaft;
      a drive belt extending between said first spring tensioned pulley and said first expansion pulley;
   means for adjusting said radius of said first expansion pulley whereby to vary the r.p.m.s of said downstream flywheel shaft relative to the r.p.m.s of said engine output drive shaft, said adjusting means comprising:
      control unit means for producing control signals corresponding to a desired vehicle speed;
      sensor means for providing information effecting said desired vehicle speed, said information processed by said control unit means for producing said control signals;
      servo means responsive to control unit means for adjusting said radius of said first expansion pulley and said r.p.m.s delivered to said downstream flywheel shaft from said engine output drive shaft;
   a flywheel coupled to said flywheel shaft;
   a second expansion pulley system comprising:
      a second spring tensioned pulley attached to a driven shaft downstream of said flywheel;
      a second expansion pulley having an adjustable radius attached to a second end of said flywheel shaft coupled to said flywheel;
      a drive belt extending between said second spring tensioned and said second expansion pulleys;
      said servo means of said adjusting means further responsive to said control signals from said control unit means for adjusting said radius of said second expansion pulley and the r.p.m.s delivered to said downstream driven shaft relative to said r.p.m.s of said flywheel shaft; and
   transmission means coupled to said downstream driven shaft.

2. The system as claimed in claim 1 further comprising:
   a fuel injection system coupled to said motor and responsive to one of said signals received from said control unit means, a delivery of fuel from said system regulating the r.p.m.s of said engine output drive shaft.

3. The system as claimed in claim 2 wherein one of said control signals from said adjusting means corresponds to a desired velocity of the vehicle.

4. The system as claimed in claim 2 wherein one of said signals from said adjusting means results from said sensor means information which corresponds to a level of a surface supporting the vehicle.

5. The system as claimed in claim 1 further comprising:
   a third expansion pulley having an adjustable radius responsive to said adjusting of said first expansion pulley and said downstream flywheel shaft attached thereto;
   a third spring tensioned pulley;
   a drive belt extending between said third expansion and spring tensioned pulleys;
   an accessory shaft attached to said third spring tensioned pulley;
   an accessory pulley attached to said accessory shaft, said adjustment of said radius of said first expansion pulley adjusting said radius of said third expansion pulley in a manner to maintain the r.p.m.s of said belt driven accessory shaft at a preselected r.p.m.

6. The system as claimed in claim 1 further comprising:
   a fluid valve coupled to said transmission means, said fluid valve operable between open and closed positions;
   means for selectably operating said fluid valve for delivery of fluid to said transmission means, whereby for shifting said transmission means between a first and second gear in response to a selected r.p.m. of said driven shaft of said transmission.

7. A power system for a vehicle comprising:
   a motor including an output drive shaft powered at a selected r.p.m.;
   a transmission responsive to rotation of a driven shaft coupled thereto;
   a flywheel mounted about a flywheel shaft intermediate said motor and said transmission;
   a first expansion pulley system intermediate said motor drive shaft and said flywheel shaft and coupled thereto;
   a second expansion pulley system intermediate said flywheel shaft and said driven shaft of said transmission and coupled thereto;
   means for adjusting the effective radius of a pulley in said first and second expansion pulley systems in response to a selected r.p.m. of said motor drive shaft whereby to continuously adjust the r.p.m.s delivered from said motor drive shaft to said flywheel shaft and the r.p.m.s delivered from said flywheel shaft to said driven shaft of said transmission, said adjusting means including:
    servo means coupled to said pulley systems, said servo means operable to adjust the effective radius of said pulleys in said first and second pulley systems whereby to provide said adjustment of said r.p.m.s.

8. The system as claimed in claim 7 further comprising means for determining a level of a road surface of the vehicle, said adjusting means further responsive to changes in said road level whereby to operate said servo means in said first or second pulley systems or both.

9. The system as claimed in claim 7 further comprising means for regulating said r.p.m.s of said motor drive shaft.

10. The system as claimed in claim 9 wherein said regulating means comprises a fuel injection system coupled to said motor.

11. The system as claimed in claim 7 wherein said adjusting means further includes a control unit responsive to a desired r.p.m. of said motor drive shaft, said control unit operating said servo means according to said desired r.p.m.s of said drive shaft or driven shaft or both.

12. The system as claimed in claim 7 further comprising:
    an accessory shaft;
    an accessory pulley attached to said accessory shaft;
    a third expansion pulley system intermediate said first expansion pulley system and said accessory shaft and attached thereto, said third pulley system responsive to said adjusting of said first pulley system whereby to maintain the r.p.m.s of said motor drive shaft delivered to said accessory shaft at a predetermined level.

13. The system as claimed in claim 7 further comprising:
    a fluid valve coupled to said transmission, said fluid valve operable between open and closed positions;
    means for selectably operating said fluid valve for delivery of fluid to said transmission, whereby for shifting said transmission between a first and a second gear in response to a selected r.p.m. of said driven shaft of said transmission.

14. A power system for a vehicle comprising:
    an engine having an output drive shaft;
    means for regulating a speed of said output drive shaft of the engine;
    control means for producing signals responsive to a desired change in the r.p.m.s of said engine drive shaft;
    first and second servo means responsive to said control means signals;
    a first expansion pulley system connected to said drive shaft, said first system responsive to said first servo means in a manner wherein the effective radius of said first expansion pulley system is regulated by said control means signals delivered thereto;
    a flywheel displaced from said drive shaft and coupled to said first expansion pulley system, said effective radius of said first expansion pulley system regulating the r.p.m.s delivered from said drive shaft to said flywheel;
    a second expansion pulley system coupled to said flywheel, said second system responsive to said second servo means in a manner wherein the effective radius of said second expansion pulley system is regulated by said control means signals delivered thereto;
    means for coupling said second expansion pulley system to a drive shaft of a transmission, whereby the r.p.m.s of the engine drive shaft is regulated for delivery to said flywheel and from said flywheel to said drive shaft of said transmission by said first and second expansion pulley systems.

15. The system as claimed in claim 14 wherein said produced control means signals are further responsive to changes in level of a road surface supporting the vehicle.

16. The system as claimed in claim 14 wherein said regulating means comprises a fuel system coupled to said engine and regulated by said control means signals.

17. The system as claimed in claim 14 further comprising:
    an accessory shaft;
    an accessory pulley attached to said accessory shaft;
    a third expansion pulley system intermediate said first expansion pulley system and said accessory shaft and attached thereto, said third pulley system responsive to said adjusting of said first pulley system whereby to maintain the r.p.m.s of said engine-drive shaft delivered to said accessory shaft at a predetermined level.

18. The system as claimed in claim 15 further comprising:
    a fluid valve coupled to said transmission, said fluid valve operable between open and closed positions;
    means for selectably operating said fluid valve for delivery of fluid to said transmission, whereby for shifting said transmission between a first and a second gear in response to a select r.p.m. to said drive shaft of said transmission.

* * * * *